(12) United States Patent
Thompson

(10) Patent No.: US 12,351,208 B2
(45) Date of Patent: Jul. 8, 2025

(54) SYSTEMS AND METHODS OF DETERMINING CHANGES IN POSE OF AN AUTONOMOUS VEHICLE

(71) Applicant: TORC Robotics, Inc., Blacksburg, VA (US)

(72) Inventor: David Thompson, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 249 days.

(21) Appl. No.: 18/313,863

(22) Filed: May 8, 2023

(65) Prior Publication Data

US 2024/0375677 A1    Nov. 14, 2024

(51) Int. Cl.
*B60W 40/02* (2006.01)
*B60W 60/00* (2020.01)
*G06T 7/70* (2017.01)

(52) U.S. Cl.
CPC .......... *B60W 60/001* (2020.02); *B60W 40/02* (2013.01); *G06T 7/70* (2017.01); *B60W 2420/403* (2013.01); *G06T 2207/20081* (2013.01); *G06T 2207/30252* (2013.01)

(58) Field of Classification Search
CPC .............. B60W 60/001; B60W 40/02; B60W 2420/403; G06T 7/70; G06T 2207/20081; G06T 2207/30252
See application file for complete search history.

*Primary Examiner* — Mathew Franklin Gordon
(74) *Attorney, Agent, or Firm* — Armstrong Teasdale LLP

(57) ABSTRACT

A vehicle comprises a sensor configured to capture images and one or more processors. The one or more processors can be configured to receive a single image from the sensor, the single image captured by the sensor as the autonomous vehicle was moving; execute a machine learning model using the single image as input to generate a change in pose of the autonomous vehicle, the machine learning model trained to output changes in pose of autonomous vehicles based on blurring in individual images; determine a global position of the autonomous vehicle based on the generated change in pose of the autonomous vehicle; and transmit the global position to an autonomous vehicle controller configured to control the autonomous vehicle.

20 Claims, 5 Drawing Sheets

SYSTEMS AND METHODS OF DETERMINING CHANGES IN POSE OF AN AUTONOMOUS VEHICLE

TECHNICAL FIELD

The present disclosure relates generally to autonomous vehicles and, more specifically, to systems and methods for automatically determining visual odometry of an autonomous vehicle using machine learning.

BACKGROUND

The use of autonomous vehicles has become increasingly prevalent in recent years, with the potential for numerous benefits, such as improved safety, reduced traffic congestion, and increased mobility for people with disabilities. For proper operation, autonomous vehicles can collect large amounts of data regarding the surrounding environment. Such data may include data regarding other vehicles driving on the road, identifications of traffic regulations that apply (e.g., speed limits from speed limit signs or traffic lights), or other objects that impact how autonomous vehicles may drive safely. Autonomous vehicles may use such data for pose estimation, where an autonomous vehicle determines various changes in pose of the autonomous vehicle over time based on images captured by sensors attached to the autonomous vehicle.

SUMMARY

Autonomous vehicles may use pose estimates for autonomous driving. Autonomous vehicles may use such pose estimates to detect changes in position of the autonomous vehicles between different points in time. Autonomous vehicles can use the detected changes in position to determine geographic locations of the autonomous vehicles (e.g., for localization) when satellite data is not available (e.g., when the autonomous vehicles lose signal with any satellites, such as when the autonomous vehicles are driving in parking garages or through a tunnel). Autonomous vehicles can use the determined geographic locations for navigation and route planning. Autonomous vehicles may need to be able to accurately follow a designated route and avoid obstacles in their path. Doing so can require accurate localization information. Autonomous vehicles can continually update the current location of the autonomous vehicles using the localization information, allowing such autonomous vehicles to stay on course and make adjustments as needed.

There are several approaches to determining pose estimates (e.g., vehicle odometry) of a vehicle. Such approaches can involve the use of multiple images to identify the distance/heading/orientation the autonomous vehicle has traveled. A challenge that autonomous vehicles may face when using multiple images for localization is the high computational complexity that can be involved in processing multiple images in real time. As multiple images may be required to be processed simultaneously, localization using multiple images may require a high processing speed and memory capacity. Another challenge is that for proper localization using multiple images, the same objects must be in each image (e.g., because localization can be performed based on the change in position of objects between multiple images). If the camera is blocked by other objects, (e.g., rain or snow built up on the sensors), the autonomous vehicle may not be able to perform proper localization.

A computer of an autonomous vehicle (or a semi-autonomous or non-autonomous vehicle) implementing the systems and methods here can overcome these technical deficiencies. For example, the computer can receive an image from a sensor (e.g., a camera or other image capture device) attached to the autonomous vehicle. The image may be of the environment surrounding the autonomous vehicle. The sensor may capture the image while the autonomous vehicle was moving, which can cause blurring in objects of the image based on the shutter speed (e.g., if the shutter speed is five milliseconds, the image can illustrate five milliseconds of motion by the vehicle). The computer can execute a machine learning model (e.g., a neural network) using the image (e.g., only the image) as input. The machine learning model may be trained to determine changes in pose of the vehicle based on single images and the blurring of the objects depicted in the single images. The machine learning model may output a change in pose (e.g., a distance traveled in the –x, –y, and/or –z direction of the autonomous vehicle or the roll, pitch, and/or yaw of the autonomous vehicle). The computer may determine a global position (e.g., a final position of the autonomous at the end of the capture of the image) of the autonomous vehicle based on the change in pose of the autonomous vehicle. The computer may transmit the global position to an autonomous vehicle controller to operate or control the autonomous vehicle. In this way, the computer can perform localization techniques on the autonomous vehicle using single images, reducing the chance of error in processing and/or reducing the computational complexity of such localization as compared to conventional multi-image-based localization techniques.

In some cases, a computer implementing the systems and methods described herein may process individual images from multiple sensors (e.g., multiple image capture devices). For example, an autonomous vehicle may include multiple sensors each configured to generate images of the surrounding environment. A computer of the autonomous vehicle may store separate machine learning models for each sensor. Each machine learning model may be tuned to have the same or identical weights or parameters (e.g., the machine learning models may be copies of each other). Each sensor may generate an image of the environment and feed the image into the machine learning model that corresponds to the sensor. Each machine learning model may generate or output a different change in pose of the autonomous vehicle based on the input image. The computer may aggregate or combine (e.g., average) the different changes in pose to determine the average or aggregate change in pose of the autonomous vehicle. The computer may use the average or aggregate change in pose of the autonomous vehicle to determine the global position or location of the autonomous vehicle.

In at least one aspect, the present disclosure describes an autonomous vehicle. The autonomous vehicle can include a sensor configured to capture images and one or more processors. The one or more processors can be configured to receive a single image from the sensor, the single image captured by the sensor as the autonomous vehicle was moving; execute a machine learning model using the single image as input to generate a change in pose of the autonomous vehicle, the machine learning model trained to output changes in pose of autonomous vehicles based on blurring in individual images; determine a global position of the autonomous vehicle based on the generated change in pose of the autonomous vehicle; and transmit the global position to an autonomous vehicle controller configured to control the autonomous vehicle.

In another aspect, the present disclosure describes a method. The method can include receiving, by one or more processors of an autonomous vehicle from a sensor of the autonomous vehicle, a single image, the image captured by the sensor as the autonomous vehicle was moving; executing, by the one or more processors, a machine learning model using the single image as input to generate a change in pose of the autonomous vehicle, the machine learning model trained to output changes in pose of autonomous vehicles based on blurring in individual images; determining, by the one or more processors, a global position of the autonomous vehicle based on the generated change in pose of the autonomous vehicle; and transmitting, by the one or more processors, the global position to an autonomous vehicle controller configured to control the autonomous vehicle.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
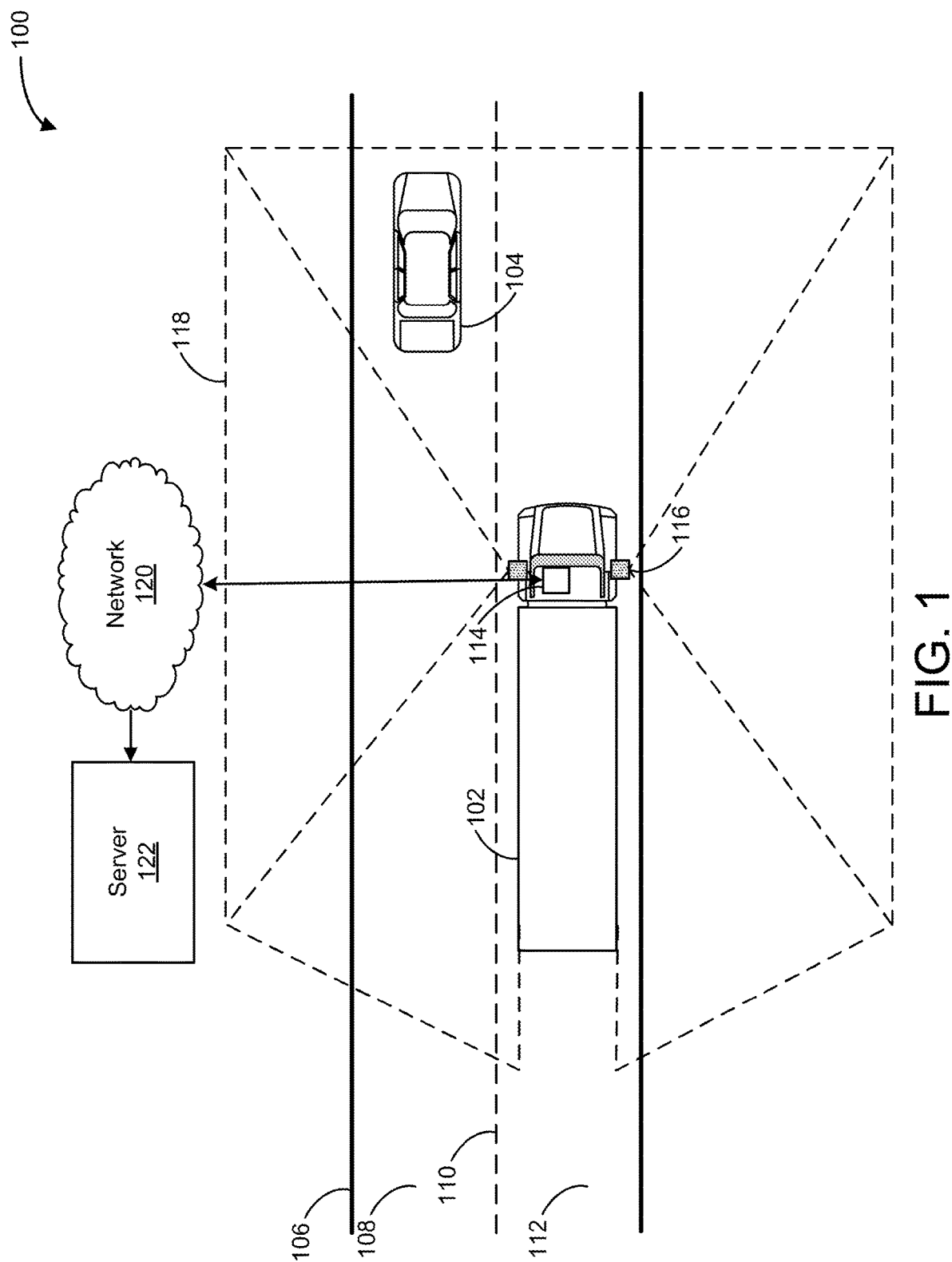
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality or not be autonomous at all. While the perception module 116 is depicted as being located at the front of the vehicle 102, the perception module 116 may be a part of a perception system with various sensors placed at different locations throughout the vehicle 102.

Figure 2:
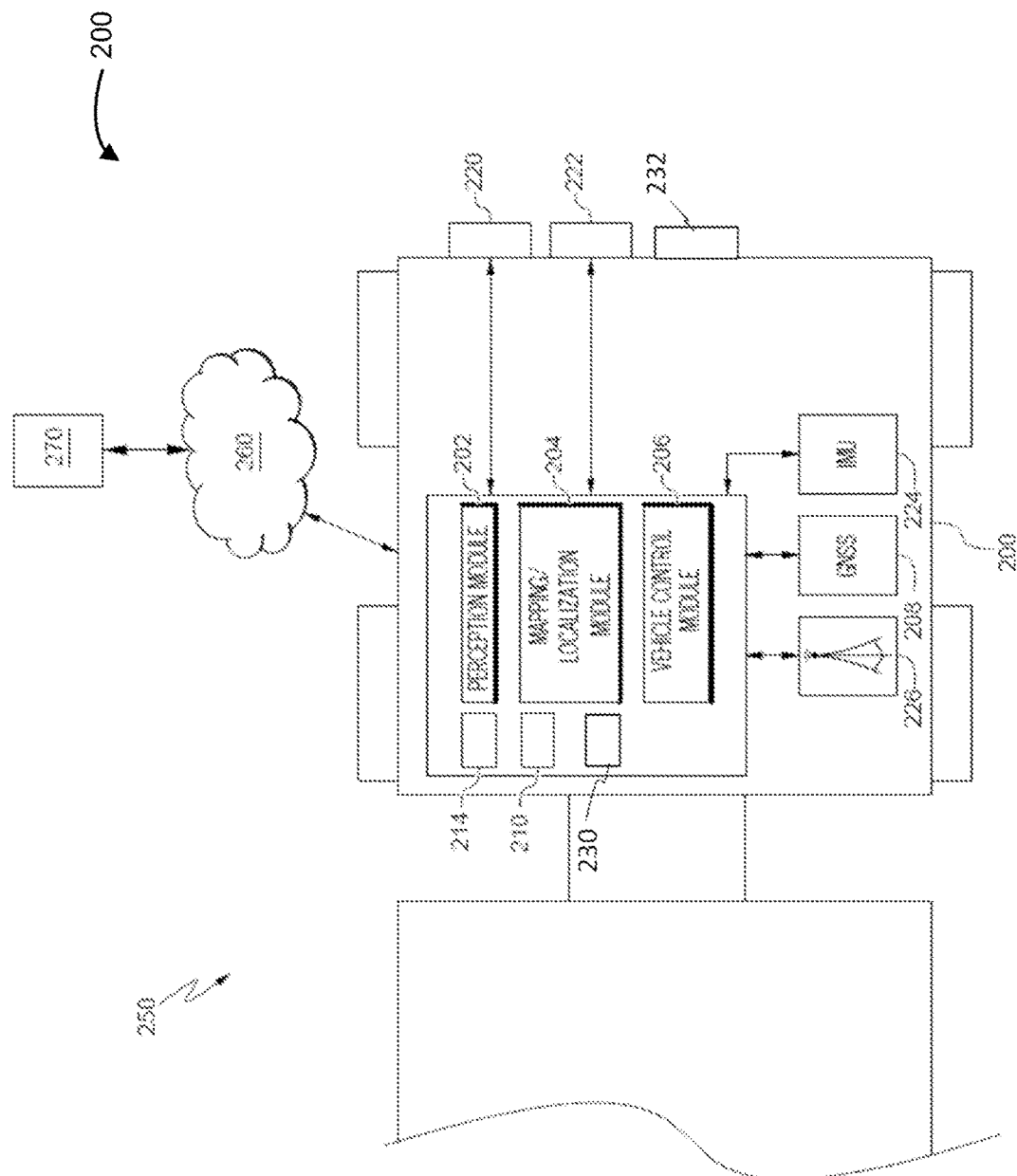
FIG. 2 is a system for determining changes in pose based on individual images, according to an embodiment.

FIG. 2 illustrates an example schematic of an autonomy system 250 of a vehicle 200, according to some embodiments. The autonomy system 250 may be the same as or similar to the autonomy system 114. The vehicle 200 may be the same as or similar to the vehicle 102. The autonomy system 250 may include a perception system including a camera system 220, a light detection and ranging (LiDAR) system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single processor or microprocessor or multiple processor or microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 3:
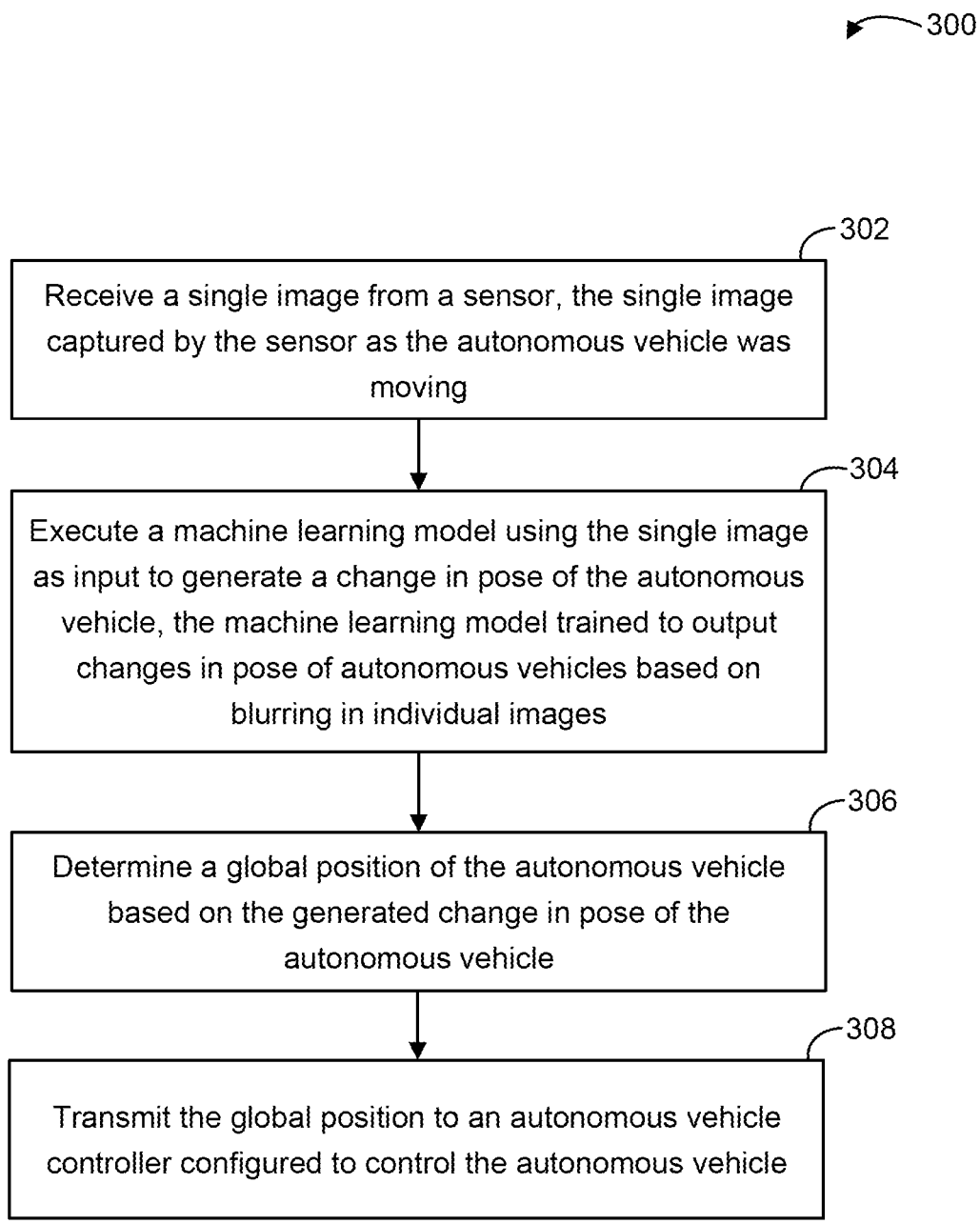
FIG. 3 is a method of determining changes in pose based on individual images, according to an embodiment.

The memory 214 of the autonomy system 250 may store data and/or software routines that may assist the autonomy system 250 in performing autonomy system 250's functions, such as the functions of the perception module 202, the mapping/localization module 204, the vehicle control module 206, a position determination module 230, and the method 300 described herein with respect to FIG. 3. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as timeseries data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.).

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The position determination module 230 may determine the position (e.g., the global position) of the vehicle 102. The position determination module 230 may be the same as or a part of the mapping/localization module 204. The position determination module 230 can use localization techniques to determine changes in location of the vehicle 102 over time. The position determination module 230 determine such changes as changes from an initial location (e.g., geographical coordinates) of the vehicle 102 to a final location of the vehicle 102. The position determination module 230 may determine the changes in location using images captured by the camera system 220. For example, the position determination module 230 can store a machine learning model (e.g., a neural network, a support vector machine, a random forest, etc.) in memory. The machine learning model may be configured to generate or output changes in pose of the vehicle 102 (or any vehicle) based on single images. The machine learning model may be configured to do so using the blur in such images (e.g., the blur in objects or edges of objects depicted in the images).

The position determination module 230 can receive an image from a camera or sensor of the camera system 220. The camera or sensor may have a non-zero shutter speed (e.g., five milliseconds). Because the shutter speed is not instant, and because the vehicle 102 may be moving while the camera or sensor is capturing the image, the image may be blurred. The position determination module 230 can execute the machine learning model using the image as input. The machine learning model may output a change in pose (e.g., one or more of a distance traveled of the autonomous vehicle during capture of the individual image, a yaw of the autonomous vehicle during capture of the individual image, a pitch of the autonomous vehicle during capture of the individual image, or a roll of the autonomous vehicle during capture of the individual image). The position determination module 230 can use the output change in pose to determine a geographical location of the vehicle 102. Position and location can be used interchangeably throughout this disclosure and refer to geographical coordinates (e.g., (x,y) coordinates or (x,y,z) coordinates).

The position determination module 230 can determine the geographical location of the vehicle 102 based on the change in pose of the vehicle and an initial position of the vehicle 102. For example, the position determination module 230 may determine the initial position of the vehicle 102 as the position (e.g., the geographical position) of the vehicle 102 when the sensor began capture of the image. The position determination module 230 can do so, for example, based on a timestamp that the sensor inserts into the image or the data packet or message that includes the image that indicates the time at which the sensor began capture of the image. The position determination module 230 can aggregate the change in pose of the vehicle 102 with the initial position of the vehicle (e.g., adjust the initial position of the vehicle 102 with the change in pose of the vehicle 102). The aggregate position can be the geographical position of the vehicle (e.g., the geographical position of the vehicle at the end of the sensor's capture of the image). In this way, the position determination module 230 can determine the geographical position of the vehicle 102 using individual images instead of multiple images (e.g., sequences of images).

The geographical position of the vehicle 102 determined by the position determination module 230 can be used to control the autonomous vehicle 102. For example, the position determination module 230 can feed the geographical position that the position determination module 230 determined into the vehicle control module 206. The vehicle control module 206 (e.g., the autonomous vehicle controller) can use the geographical position for navigation (e.g., to determine when to turn or where the vehicle 102 is relative to an object, sign, or turn in the road). In another example, the position determination module 230 can transmit the geographical position to the remote server 270. The remote server 270 can store the geographic data along with geographic data of other autonomous vehicles (e.g., global positioning data calculated similarly by other autonomous vehicles and/or satellite data of satellites monitoring the positions of the autonomous vehicles). In some cases, the remote server 270 can use the remote data to transmit routes to autonomous vehicles in communication with the remote server 270, such as to avoid congestion.

FIG. 3 shows execution steps of a processor-based method using the system 250, according to some embodiments. The method 300 shown in FIG. 3 comprises execution steps 302-310. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 3 is described as being performed by a data processing system stored or on or otherwise located at a vehicle, such as the autonomy system 250 depicted in FIG. 2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

Using the method 300, the data processing system may perform localization functions by processing single images instead of sequences of images (e.g., instead of multiple images captured in sequence by individual cameras). For example, an autonomous vehicle (or any other type of vehicle, such as a semi-autonomous or manually driven vehicle) may include one or more cameras, sensors, or other image capture devices located at different points or locations on the vehicle. Each camera can face a different direction and/or have a different field of view. The cameras can each capture an image (e.g., a single image). The cameras can transmit the images to the data processing system of the autonomous vehicle. The data processing system can analyze each of the images separately, such as by using machine learning techniques. Based on the analysis, the data processing system can determine a change in pose (e.g., a change in pose of the autonomous vehicle) for each image. The data processing system can average or otherwise filter the changes in pose to generate a final change in pose or output change in pose for the autonomous vehicle. The data processing system can determine a global position of the autonomous vehicle (e.g., a global position of the autonomous vehicle at the end of the capture of the images) based on the final or output change in pose. The data processing system may transmit the global position to a controller of the autonomous vehicle.

For example, at step 302, the data processing system receives a single image from a sensor. The data processing system may be stored locally at (e.g., in) an autonomous vehicle or remote from the autonomous vehicle. The sensor may be located at (e.g., on) a surface (e.g., an outer surface) of the autonomous vehicle. The sensor may be or include a camera, video recorder, or some other video capture device. The sensor may capture the single image by opening and closing a shutter of the sensor. The shutter may be a device within a sensor that controls the duration of time that light is allowed to enter the sensor. When the shutter is open, light can enter the sensor and be captured by the sensor. The sensor can record the image. The amount of time that the shutter is open can correspond to a level of motion blur in the resulting image (e.g., the longer it takes for the shutter to shut, the more blur in an image when the sensor is moving because the captured light is captured for a longer time frame). When the shutter is closed, no light may be allowed to enter the sensor until the sensor completes capturing the image. The sensor can capture the image as the autonomous vehicle is moving (and thus while the sensor is moving), which can cause objects in the image to be blurred. The sensor can capture the image and transmit or send the image to the data processing system. The data processing system can receive the image and process the image.

At step 304, the data processing system executes a machine learning model. The machine learning model can be a neural network (e.g., a convolutional neural network), a support vector machine, a random forest, etc. The data processing system can execute the machine learning model using the single image received from the sensor as input. The data processing system can execute the machine learning model and the machine learning model may output a change in pose. The change in pose can be a change in pose of the autonomous vehicle. The change in pose can include one or more attributes (e.g., values for one or more attributes), such as a distance traveled of the autonomous vehicle (e.g., during capture of the individual image), a yaw of the autonomous vehicle (e.g., during capture of the individual image), a pitch of the autonomous vehicle (e.g., during capture of the individual image), or a roll of the autonomous vehicle (e.g., during capture of the individual image). The change in pose can correspond to an amount of blur in the single image (e.g., the more blurry the image the higher the change in pose). Blur may be the reduction in sharpness or clarity of an image. Objects may be blurred when the edges are not defined or pixels defining the edges are spread apart. The machine learning model may output a value for each of the attributes of the change in pose. The machine learning model may do so, for example, based on the values corresponding to a highest percentage or probability compared to other potential values for which the machine learning model may provide output.

The machine learning model may be trained to output changes in pose of vehicles based on individual images. The machine learning model may be trained using a supervised training method. For example, the machine learning model may receive a training data set. The training data set may include different images (e.g., vectors representing the images). Each image of the training data set may be labeled with a ground truth or correct label indicating the correct prediction (e.g., change in pose prediction) for the image. The label may include one or more of a distance traveled of an autonomous vehicle (e.g., during capture of the individual image), a yaw of an autonomous vehicle (e.g., during capture of the individual image), a pitch of an autonomous vehicle (e.g., during capture of the individual image), or a roll of an autonomous vehicle (e.g., during capture of the individual image). The change in pose can correspond to an amount of blur in the single image (e.g., the more blurry the image, the higher the change in pose). Each image of the training data set may be labeled with the same attributes for the image. The machine learning model may separately receive each image of the training data set as input and generate or predict a change in pose based on the image. For each image, the machine learning model may be trained by a training computing device (e.g., by the data processing system or by another computing device) when the training computing device compares the output prediction by the machine learning model for the image with the ground truth or label of the image. The training computing device may determine a difference according to a loss function and use back-propagation techniques to adjust the parameters and/or weights of the machine learning model according to the difference and/or loss function. The training computing device may similarly train the machine learning model using each labeled image of the training data set.

The training computing device may train the machine learning model until the machine learning model is accurate to an accuracy threshold. For example, the training computing device may periodically test the accuracy of the machine learning model. The training computing device may do so, for example, by executing the machine learning model using an image as input, identifying the output change in pose for the image, and comparing the output with a ground truth value for the image. The training computing device may determine the accuracy to be the percentage of the output change in pose compared to the ground truth. The training computing device can compare the accuracy to a threshold (e.g., an accuracy threshold). The training computing device can similarly determine the accuracy of the machine learning model at set intervals or pseudo-randomly during training until determining the machine learning model has an accuracy exceeding the threshold. Responsive to determining the machine learning model has an accuracy exceeding the threshold, the training computing device can deploy (e.g., transmit to the autonomous vehicle or otherwise implement for localization of the autonomous vehicle) the machine learning model.

In training the machine learning model, the training computing device can train the machine learning model based on blurred objects in individual images. For example, because objects depicted in images may be blurry as a result of the autonomous vehicle moving when the images are captured, information can be gleaned from the amount of blur in the images. The blur can be blurred outlines of objects, blurred signposts, blurred lines on the road, blurred buildings, etc. The machine learning model may be trained to identify or take such blurring into account when generating predicted changes in pose of autonomous vehicles based on individual images.

In some cases, the training computing device can train the machine learning model to output changes in pose based on other data (e.g., metadata) of the image (e.g., but not multiple images). For example, the training computing device can include estimates of the changes in pose that correspond to the individual training images. The estimates can be values for changes in pose. The training computing device can input an estimate with each training image into the machine learning model to generate an output change in pose and use a loss function and/or back-propagation techniques to train the machine learning model to generate output changes in pose based on singular images and the corresponding estimates.

The data processing system can receive and/or use the machine learning model to generate changes in pose from individual images received from the sensor and/or estimates of the changes in pose that correspond to the individual images. For example, the data processing system can receive the single image from the sensor. The data processing system can determine an estimate for the single image, such as by calculating the estimate from data from other sensors such as based on the speed or velocity of the autonomous vehicle (e.g., an average of the speed or velocity of the autonomous vehicle when the sensor captured the single image multiplied by the shutter speed), based on data from motion sensors (e.g., an IMU), and/or based on an internal compass of the autonomous vehicle. In some cases, such inputs are input into the machine learning model instead of or in addition to any estimates calculated based on the values from such sensors. The data processing system may execute the machine learning model based the single image and, in some cases, any combination of metadata for the image to generate an output change in pose of the autonomous vehicle. The output change in pose can represent a change in pose of the autonomous vehicle during the time frame or time period in which the sensor captured the single image.

At step 306, the data processing system determines a global position of the autonomous vehicle. The data processing system may determine the global position of the autonomous vehicle based on the change in pose generated by the machine learning model based on the single image and, in some cases, any combination of metadata for the single image. The data processing system may determine the global position of the autonomous vehicle based on an initial position of the autonomous vehicle (e.g., an initial position of the autonomous vehicle when the sensor began capturing the image).

For example, the data processing system can identify or determine the initial position of the autonomous vehicle when the sensor began capturing the single image. The data processing system can identify or determine the initial position of the autonomous vehicle, for example, based on global position system (GPS) data that locates or identifies the global position of the autonomous vehicle by identifying GPS data identifying the location of the autonomous vehicle with a timestamp that corresponds to a timestamp generated by or corresponding to the time in which the sensor began capturing the single image. In another example, the data processing system can determine the initial position to be the global position that the data processing system previously determined based on another image (e.g., a previous image) the sensor or another sensor captured. The data processing system can aggregate the change in pose output by the machine learning model with the initial position of the autonomous vehicle (e.g., the data processing system can adjust the initial position of the autonomous vehicle based on the change in pose output by the machine learning model) to generate the global position of the autonomous vehicle. The global position of the autonomous vehicle may be the position of the autonomous vehicle at the end of the capture of the single image.

At step 310, the data processing system transmits the global position to an autonomous vehicle controller. The autonomous vehicle controller can be an application, an application programming interface, another computing device local (e.g., located in) the autonomous vehicle, or a remote computing device (e.g., a server, such as a cloud server). In some cases, the data processing system can be the mapping/localization module 204 and the autonomous vehicle controller can be the vehicle control module 206. In some cases, the data processing system is the mapping/localization module 204 and/or the vehicle control module 206. The data processing system can transmit the global position to the autonomous vehicle controller. The autonomous vehicle can receive the global position and control the vehicle based on the global position.

The autonomous vehicle controller can control the vehicle based on the global position. For example, the autonomous vehicle controller can control the autonomous vehicle to a destination according to a predefined path. The autonomous vehicle controller can receive the global position and compare the global position to the predefined path. Based on the comparison, the autonomous vehicle controller can determine or select a trajectory that causes the autonomous vehicle to travel according to the predefined path. The data processing system and the autonomous vehicle controller can periodically or continuously determine the global position of the autonomous vehicle and control the autonomous vehicle according to the predefined path in this way over time (e.g., continuously receive captured images from sensors, determine changes in pose of the autonomous vehicle based on the images, identify initial positions of the autonomous vehicle (e.g., the global position determined based on the previously captured image or based on GPS data), and determine new global positions of the autonomous vehicle by aggregating the changes in pose with the initial positions). In this way, the data processing system may use localization techniques to determine the global position of the vehicle in areas where the data processing system may not have signal or a connection with any satellites to query the position of the autonomous vehicle or when the data processing system may have signal that may go in and out (e.g., during a cloudy day or when signal quality is otherwise low). The data processing system may do so using single images (e.g., only the single images) instead of a sequence of images, thus reducing the processing requirements and/or possibilities for error.

In some cases, the data processing system may use images from multiple cameras, sensors, or other image capturing devices to determine the global position of the autonomous vehicle. For example, multiple sensors may be placed on one or more surfaces of the autonomous vehicle. Each sensor can have or include a different field of view. Each sensor may capture an image (e.g., a single image) of the environment surrounding the vehicle. The sensors may transmit the captured images to the data processing system. In some cases, the sensors may transmit the captured image to the data processing system with timestamps indicating the times in which the data sensors began or stopped capture of the images. The data processing system may receive the images and/or timestamps. The data processing system may determine or select the images responsive to the images corresponding to timestamps within a defined threshold or range of each other. In some cases, the data processing system receives images from the sensors at set intervals and identifies or selects the images that correspond to the same interval. The data processing system may use the selected images for localization.

For example, the data processing system may store a machine learning model in memory for each sensor with which the data processing system communicates. Each machine learning model may have identical or the same weights and/or parameters as each other (e.g., a training computer device may train one machine learning model as described above and generate a number of copies of the machine learning model equal to the number of sensors that provide images to the data processing system). The data processing system may identify the machine learning models that correspond with the sensors that captured the images (e.g., the single images) the data processing system selected. The data processing system may input the individual images into the respective machine learning models that correspond to the sensors that captured the images and execute the respective machine learning models. In some cases, the data processing system may input metadata into each machine learning model (e.g., input the same metadata into each machine learning model) with the respective images and execute the machine learning models with the individual images and the metadata. The machine learning models may each output a change in pose based on the input images and/or metadata. The changes in pose output by the individual machine learning models may be initial changes in pose.

The data processing system may average and/or filter the changes in pose generated by the different machine learning models. For example, the data processing system may aggregate the changes in pose to obtain an aggregated change in pose and divide the aggregated change in pose by the number of changes in pose output by the machine learning models to generate a change in pose (e.g., an average or total change in pose) for the autonomous vehicle. The change in pose calculated as a function of or based on the initial changes in pose can be a final change in pose. Thus, the data processing system may remove or reduce bias in the predicted change in pose of any individual machine learning model. The data processing system may transmit the final or output change in pose to the autonomous vehicle controller to control the vehicle based on the final change in pose.

In some cases, when or prior to averaging the changes in pose of the autonomous vehicle, the data processing system can remove outliers from the changes in pose calculated by the different machine learning models. The data processing system may do so, for example, by comparing the changes in pose and removing or discarding (e.g., removing from memory) changes in pose that exceed a standard deviation (or another metric) of the average or median of the changes in pose provided by the different machine learning models. In this way, the data processing system may further increase the accuracy of the change in pose prediction.

In some cases, the machine learning model may be a dual-stage machine learning model. For example, the machine learning model may be or include an encoder and a decoder. The encoder may be configured or trained to receive images and, in some cases, metadata of the images as described above, and output an embedding (e.g., a numerical string or vector) for each image. The decoder can be trained to receive such embeddings and output changes in pose of the autonomous vehicle based on the embeddings (e.g., a change in pose for each embedding). The data processing system can input the single image and, in some cases, metadata of the single image into the encoder and execute the encoder. The encoder can output an embedding based on the single image and/or metadata. The data processing system can feed the embedding into the decoder. The data processing system can execute the decoder to cause the decoder to output a change in pose for the autonomous vehicle. Such a machine learning model can offer improved accuracy of determining changes in pose of an autonomous vehicle based on individual images. In cases in which multiple sensors capture images and multiple machine learning models process the images, each machine learning model can be similarly configured to have an encoder and a decoder.

In some cases, the machine learning model can have multiple decoders (e.g., multiple heads). For example, each decoder can be configured or trained to generate different types of output for the autonomous vehicle controller to use to control the autonomous vehicle based on embeddings generated from individual images and/or metadata. Examples of such outputs can include a speed prediction or a turn prediction. The data processing system can feed individual images and, in some cases, metadata for the individual images into the encoder to generate an embedding for each individual image. The data processing system can input the embeddings separately into each decoder to generate predictions for vehicle control. In some cases, the data processing system can select which decoder to use depending on the configuration of the data processing system or the situation for which the data processing system is making a prediction.

The data processing system can encode one or more timestamps into the single image. In doing so, the data processing system can encode a timestamp into one or more portions of the single image. Each of the one or more portions can be a vertical line of pixels, a horizontal line of pixels, and/or a square, rectangle, or another shape of pixels within the single image, for example. The one or more portions can each be a single pixel. The timestamps can indicate the real-world time to which the respective portions correspond.

For example, the data processing system can encode timestamps into individual pixels of the single image. The data processing system may do so, for example, by assigning each pixel with a unique timestamp value based on the pixel's position in the image. The timestamp value of a timestamp for a pixel could be calculated based on the pixel's (x,y) coordinates within the image and the time the image was captured. The data processing system may determine the time the image was captured based on a timestamp the sensor that captured the image included in the message to the data processing system that included the image. The data processing system can similarly determine timestamps of portions of images. The data processing system may similarly determine timestamps for each pixel and/or portion of the image.

The data processing system can encode the timestamps, for example, by mapping the timestamp values to a range of values that can be represented by the image's color depth, such as 0-255 for an 8-bit color image and inserting the timestamp values into the images at the corresponding pixels. In some cases, the data processing system can add timestamps to the image metadata, such as EXIF data, to make the timestamps easier to extract and insert into the machine learning model.

The data processing system can insert the single encoded with the timestamp data and/or the single image with the time stamp metadata, in some cases with other metadata for the image, into the machine learning model. The machine learning model may be trained as described above to output changes in pose based on such data and output a change in pose of the autonomous vehicle based on the single image, timestamp data, and/or other metadata. In cases in which multiple sensors capture images and multiple machine learning models process the images, each machine learning model can be similarly configured to process timestamp data. Using such timestamp data can improve the accuracy of the machine learning models.

Figure 4A:
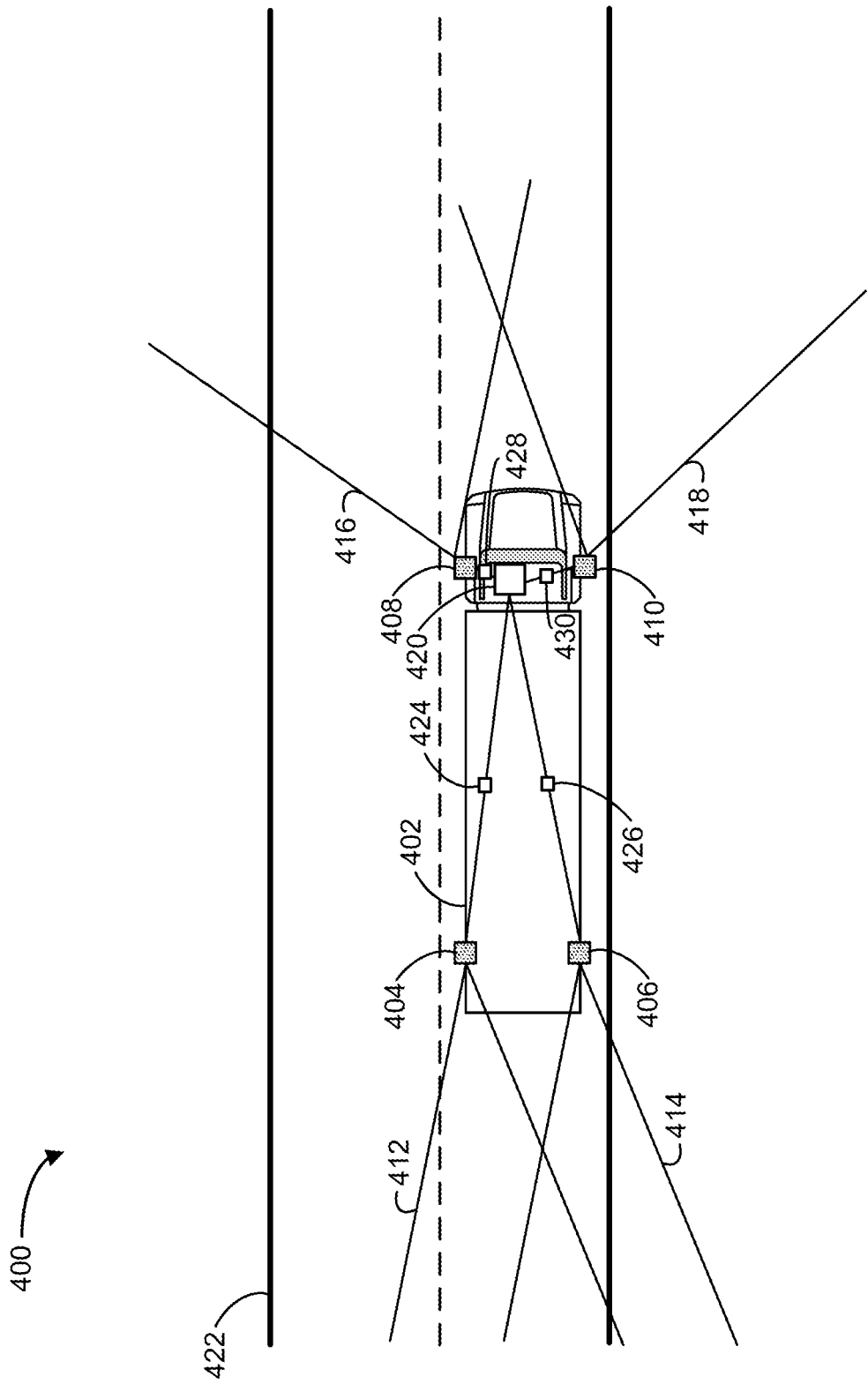
FIG. 4A depicts a bird's-eye view of a roadway scenario of determining changes in pose based on individual images, according to an embodiment.

FIG. 4A depicts a bird's-eye view of a roadway scenario of determining changes in pose based on individual images, according to an embodiment. FIG. 4 illustrates an environment 400 that includes a vehicle 402. The vehicle 402 can be the same as or similar to the vehicle 102. The vehicle 402 can include sensors 404, 406, 408, and 410. The sensors 404, 406, 408, and 410 can be cameras or other image capture devices. The sensors 404, 406, 408, and 410 can be cameras of the camera system 220. The sensors can respectively have fields-of-view 412, 414, 416, and 418. The vehicle 402 can include a data processing system 420. The data processing system 420 can include one or more processors and memory. The data processing system 420 can be the same as or similar to the autonomy system 250, as described with reference to FIG. 2.

One or more of the sensors 404, 406, 408, and 410 can capture images as the vehicle 402 travels down a road 422. The sensors 404, 406, 408, and 410 can transmit the images to the data processing system 420. The data processing system 420 can receive the images, process the images, and determine changes in pose of the vehicle 402 based on the images.

For example, the sensors 404, 406, 408, and 410 can capture and respectively transmit images 424, 426, 428, and 430 to the data processing system 420. The data processing system 420 can receive each of the images 424, 426, 428, and 430. The data processing system 420 can store and identify machine learning models that correspond to the sensors 404, 406, 408, and 410 that respectively transmitted the images 424, 426, 428, and 430 to the data processing system 420. The data processing system 420 can execute each of the identified machine learning models using the images 424, 426, 428, and 430, metadata for the images, and/or timestamp data for the images that correspond to the same sensors 404, 406, 408, and 410 as the machine learning models as input. Each machine learning model can generate a change in pose (e.g., an initial change in pose) based on the input into the machine learning model. The data processing system can filter and/or average the changes in pose output by the machine learning models to generate a change in pose (e.g., a final change in pose) for the vehicle 402 that indicates the change in pose of the vehicle 402 during the time period in which the images 424, 426, 428, and 430 were captured.

The data processing system 420 can determine a global position of the vehicle 402 based on the change in pose of the vehicle 402. The data processing system 420 may do so, for example, by adjusting an initial position of the vehicle 402 by the determined change in pose of the vehicle 402. For instance, the data processing system 420 can identify an initial position of the vehicle 402 indicating the global position of the vehicle 402 at the time in which the sensors 404, 406, 408, and 410 began capture of the images 424, 426, 428, and 430. The data processing system 420 can aggregate the change in pose of the vehicle 402 with the initial position to determine the global position of the vehicle 402. In this way, the data processing system 420 can determine the global position of the vehicle 402 at the end of the time period in which the images 424, 426, 428, and 430 were captured.

Figure 4B:
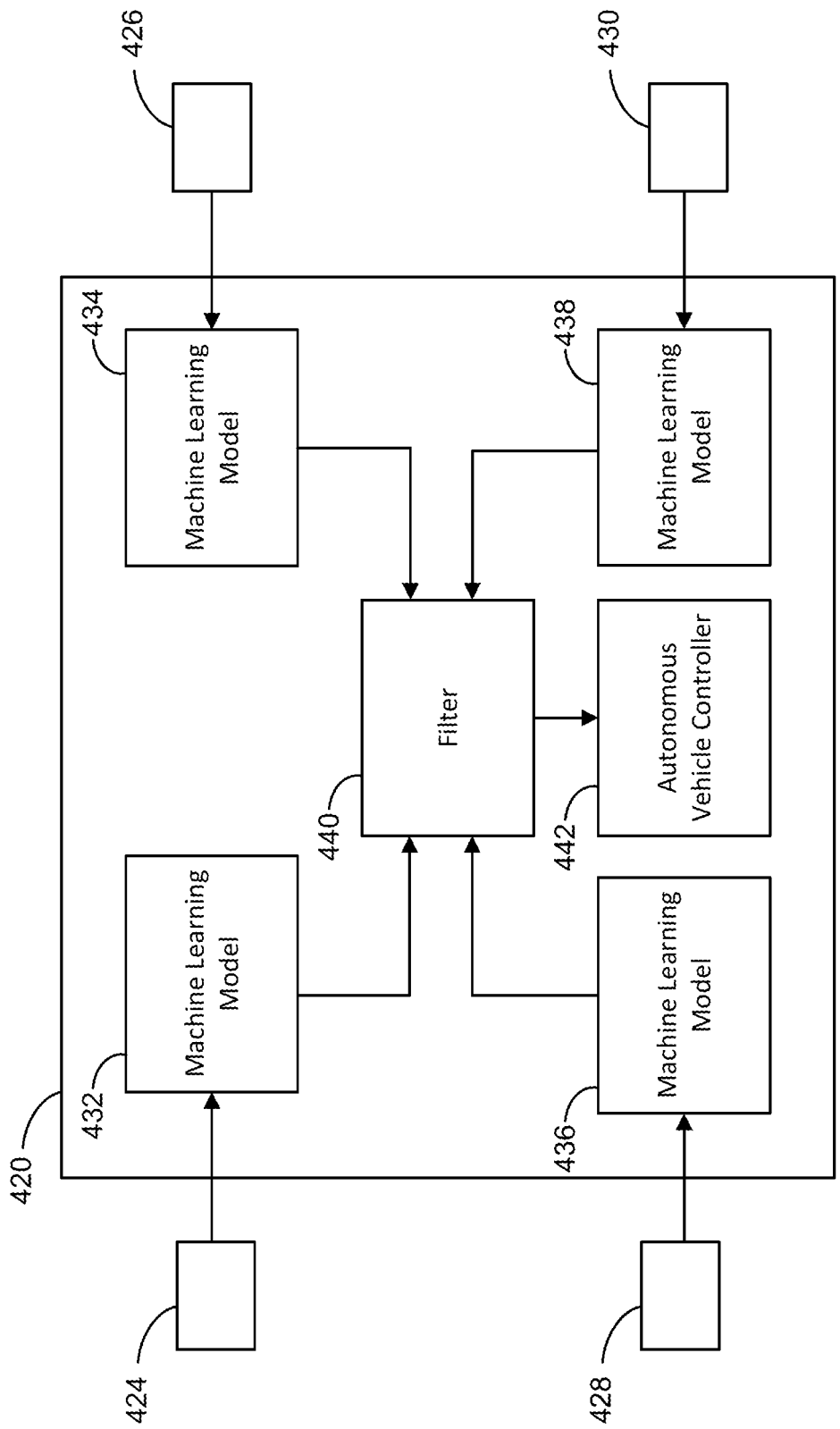
FIG. 4B depicts a block diagram of data transfer for determining changes in pose based on individual images, according to an embodiment.

FIG. 4B depicts a block diagram of data transfer for determining changes in pose based on individual images, according to an embodiment. FIG. 4B illustrates a detailed view of the data processing system 420 of FIG. 4A receiving and processing the images 424, 426, 428, and 430. The data processing system 420 can receive any number of images. The data processing system 420 can include machine learning models 432, 434, 436, and 438. The data processing system 420 can include any number of machine learning models similar to or the same as the machine learning models 432, 434, 436, and 438. The machine learning models 432, 434, 436, and 438 can each be copies of the same machine learning model (e.g., be the same type of machine learning model and/or have the same weights and/or parameters). The machine learning models 432, 434, 436, and 438 may each be trained to receive individual images, metadata, and/or timestamp information (e.g., timestamps encoded into the images, such as pixels of the images, or timestamps included as metadata of the images) and output changes in pose of a traveling or moving vehicle (e.g., an autonomous vehicle or the vehicle 402) on which the sensors that captured the images are located. The changes in pose may correspond to movement of the vehicle during the time period in which the sensors captured the images. The data processing system 420 can respectively insert the images 424, 426, 428, and 430 into the machine learning models 432, 434, 436, and 438 and execute the machine learning models 432, 434, 436, and 438. The machine learning models 432, 434, 436, and 438 can each output a change in pose. The data processing system 420 can insert the output changes in pose to the filter 440.

The filter 440 can be or include instructions stored in memory of the data processing system 420 that cause the data processing system 420 to generate or calculate a change in pose (e.g., a total change in pose or an average change in pose) of the vehicle 402 based on the multiple changes in pose output by the machine learning models 432, 434, 436, and 438. The filter 440 can be configured to receive images, remove outlier changes in pose, and/or average or otherwise calculate a change in pose of the vehicle 402. For example, the filter 440 can receive the changes in pose from the machine learning models 432, 434, 436, and 438. The filter 440 can filter out changes in pose such as by identifying or determining any changes in pose that satisfy a condition (such as being a standard deviation or two standard deviations above an average or median of the changes in pose provided by the machine learning models 432, 434, 436, and 438). The filter 440 can be configured to identify or determine changes in pose that satisfy a condition using any metric or technique. The filter 440 can discard any changes in pose that satisfy such a condition.

The filter 440 can be configured to generate, calculate, or determine changes in pose based on changes in pose output by the machine learning models 432, 434, 436, and 438. The filter 440 can generate such changes in pose based on changes in pose that the filter 440 did not discard and/or based on each change in pose the filter 440 receives from the machine learning models 432, 434, 436, and 438. The filter 440 can calculate the change in pose (e.g., the final change in pose) based on changes in pose (e.g., the unfiltered initial changes in pose) output by the machine learning models 432, 434, 436, and 438 by calculating an average, median, or performing any other function on the changes in pose. The output change in pose from the filter 440 can be the determined change in pose of the vehicle 402. The filter 440 can transmit the determined change in pose to the autonomous vehicle controller 442.

The autonomous vehicle controller 442 can be or include instructions stored in memory of the data processing system 420 that cause the data processing system 420 to control the vehicle 402, such as for autonomous driving. The autonomous vehicle controller 442 can be the same as the vehicle control module 206, in some cases, or can be a computer separate from the data processing system 420 and/or the vehicle 402 (e.g., the autonomous vehicle controller 442 can be a remote computing device or a cloud computer). The autonomous vehicle controller 442 can control the vehicle 402 based on changes in pose transmitted to the autonomous vehicle controller 442 by the filter 440. For example, the autonomous vehicle controller 442 can be configured to control the vehicle 402 to drive to a destination using a stored map (e.g., a digital map, as described above). In doing so, the autonomous vehicle controller 442 may continuously determine the location of the vehicle 402 and determine control signals to use to follow different trajectories (e.g., speeds, velocities, directions, turns, distances, etc.) to reach the destination according to the map. The autonomous vehicle controller 442 can select trajectories from a plurality of trajectories based on the current location (e.g., the global location or global position) of the vehicle 402. The autonomous vehicle controller 442 can control the vehicle 402 according to the selected trajectory.

The autonomous vehicle controller 442 can determine the determine the location of the vehicle 402 based on GPS data and/or using localization techniques, such as the techniques described herein. For example, as the autonomous vehicle 402 is driving down the road, the autonomous vehicle controller 442 can continuously retrieve or poll satellite data or other positioning data to determine the current position or location of the vehicle 402. The autonomous vehicle controller 442 can select trajectories and control the vehicle 402 to reach a defined destination according to a path (e.g., a defined path) based on the current position or location of the vehicle 402. However, in some cases, the autonomous vehicle controller 442 may travel into an area in which the autonomous vehicle controller 442 cannot or does not receive or poll satellite data or other positioning data, such as when entering a tunnel or entering another covered area. In such cases, the autonomous vehicle controller 442 may use the localization techniques described herein to determine the global position or location of the vehicle 402. The autonomous vehicle controller 442 can use the techniques described herein to continuously determine the global position or location of the vehicle 402 while in the covered area and control the vehicle 402 to follow the path according to the determined global position of the vehicle 402.

In some cases, the data processing system 420 and/or autonomous vehicle controller 442 may only use the systems and methods described herein to control the vehicle 402 when the autonomous vehicle controller 442 is not able to determine the global position of the vehicle 402 using satellite data or other positioning data. For example, the autonomous vehicle controller 442 may control the vehicle 402 to reach a destination according to a defined path using satellite data or other positioning data. However, while driving, the vehicle 402 may enter an area in which the autonomous vehicle controller 442 may not be able to receive or acquire such data. The autonomous vehicle controller 442 may determine the vehicle 402 is in such an area by determining the connection with the computer providing the data has been lost or there is latency in the connection that is greater than a threshold or a packet loss rate of the connection that is greater than a threshold. Responsive to performing such a determination, the autonomous vehicle controller 442 may use the techniques described herein to continuously determine the global position or location of the vehicle 402 and control the vehicle 402 to the destination based on the determined global position or location of the vehicle 402.

The autonomous vehicle controller 442 can stop using the systems and methods described herein to determine the global position or location of the vehicle 402 responsive to determining the vehicle 402 can receive positioning or other location data from the remote computing device or satellite. For example, while controlling the vehicle 402, the autonomous vehicle controller 442 or the data processing system 420 can repeatedly attempt to re-establish the connection with the computing device that provides positioning data for the vehicle 402 to the autonomous vehicle controller 442 or the data processing system 420. In cases in which the connection was not lost, the autonomous vehicle controller 442 or the data processing system 420 can monitor the connection and determine if a condition is satisfied (e.g., a connection condition), such as determining if the latency of the connection is below a threshold and/or the packet loss rate of the connection is below a threshold. The autonomous vehicle controller 442 or the data processing system 420 can use any condition to determine whether the connection is strong enough to rely on to determine the global position or location of the vehicle 402. Responsive to re-establishing the connection or determining a condition is satisfied (e.g., the connection has a latency below a threshold and/or a packet drop rate below a threshold), the autonomous vehicle controller 442 can use the positioning or other location data from the remote computing device or satellite to control the vehicle 402 again.

The data processing system 420 and/or autonomous vehicle controller 442 can selectively use the localization techniques described herein to determine the global position of the vehicle 402. For example, the data processing system 420 may not use the localization techniques described herein to control the vehicle 402 when the data processing system 420 has a connection with a remote computing device providing global position or location data for the vehicle 402 to the data processing system 420 or the autonomous vehicle controller 442 and the connection is strong (e.g., the connection has a latency below a threshold and/or a packet loss rate below a threshold). However, responsive to determining the data processing system 420 has lost such a connection and/or the connection is not strong (e.g., the connection has a latency exceeding a threshold and/or a packet loss rate exceeding a threshold), the data processing system 420 may perform the localization techniques described herein and execute the machine learning models 432, 434, 436, and 438 and/or the filter 440 to determine the global position for control the vehicle 402. The data processing system 420 may stop using such techniques and/or executing the machine learning models 432, 434, 436, and 438 responsive to determining the connection has been re-established or is strong enough to rely on to determine the global position or location of the vehicle 402. In this way, the data processing system 420 can reduce the processing resources that are required to control the vehicle 402.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An autonomous vehicle, comprising:
   a sensor configured to capture images; and
   one or more processors, wherein the one or more processors are configured to:
      receive a single image from the sensor, the single image captured by the sensor as the autonomous vehicle was moving;
      execute a machine learning model using the single image as input to generate a change in pose of the autonomous vehicle, the machine learning model trained to output changes in pose of autonomous vehicles based on blurring in individual images;
      determine a global position of the autonomous vehicle based on the generated change in pose of the autonomous vehicle; and
      transmit the global position to an autonomous vehicle controller configured to control the autonomous vehicle.

2. The autonomous vehicle of claim 1, wherein the one or more processors are configured to execute the machine learning model using only the single image as input to generate the change in pose of the autonomous vehicle.

3. The autonomous vehicle of claim 1, wherein the one or more processors are configured to:
   encode one or more timestamps into one or more pixels of the single image,
      wherein the one or more processors are configured to execute the machine learning model using the single image encoded with the one or more timestamps.

4. The autonomous vehicle of claim 1, wherein the machine learning model is trained to output changes in pose of autonomous vehicles based on blurred objects in individual images.

5. The autonomous vehicle of claim 1, wherein the change in pose of the autonomous vehicle comprises one or more of a distance traveled of the autonomous vehicle during capture of the single image, a yaw of the autonomous vehicle during capture of the single image, a pitch of the autonomous vehicle during capture of the single image, or a roll of the autonomous vehicle during capture of the single image.

6. The autonomous vehicle of claim 1, wherein the one or more processors are configured to determine the global position of the autonomous vehicle by:
   identifying an initial position of the autonomous vehicle; and adjusting the initial position of the autonomous vehicle based on the change in pose output by the machine learning model.

7. The autonomous vehicle of claim 1, wherein the sensor is a first sensor, the single image is a first single image, and the machine learning model is a first machine learning model;
   wherein the autonomous vehicle comprises a plurality of sensors each configured to capture images of an environment surrounding the autonomous vehicle, the plurality of sensors comprising the first sensor; and
   wherein the one or more processors are configured to:
      receive a plurality of images from the plurality of sensors, the plurality of images comprising the first single image and the plurality of sensors comprising the first sensor; and
      execute a plurality of machine learning models, including the first machine learning model, using the plurality of images as input to generate a plurality of changes in pose of the autonomous vehicle, each of the plurality of machine learning models receiving a different single image of the plurality of images as input and generating a change in pose of the autonomous vehicle based on the input single image,
         wherein the one or more processors are configured to determine the global position of the autonomous vehicle based on the plurality of changes in pose of the autonomous vehicle.

8. The autonomous vehicle of claim 7, wherein each of the plurality of machine learning models is configured to have identical weights or parameters.

9. The autonomous vehicle of claim 7, wherein the one or more processors are configured to determine the global position of the autonomous vehicle based on the plurality of changes in pose of the autonomous vehicle by:
   calculating an average change in pose of the autonomous vehicle of the plurality of changes in pose of the autonomous vehicle;
   identifying an initial position of the autonomous vehicle; and
   determining the global position of the autonomous vehicle based on the average change in pose of the autonomous vehicle and the initial position of the autonomous vehicle.

10. The autonomous vehicle of claim 1, wherein the autonomous vehicle controller is configured to:
   select a trajectory for the autonomous vehicle based on the global position; and
   control the autonomous vehicle in a direction based on the trajectory.

11. The autonomous vehicle of claim 1, wherein the machine learning model comprises an encoder and a plurality of decoders, each of the plurality of decoders configured to generate a different type of output based on embeddings generated from images; and wherein the one or more processors are configured to execute the machine learning model by:
   executing the encoder using the single image as input to generate an embedding; and
   executing the decoder of the plurality of decoders to generate the change in pose of the autonomous vehicle.

12. A method, comprising:
   receiving, by one or more processors of an autonomous vehicle from a sensor of the autonomous vehicle, a single image, the single image captured by the sensor as the autonomous vehicle was moving;
   executing, by the one or more processors, a machine learning model using the single image as input to generate a change in pose of the autonomous vehicle, the machine learning model trained to output changes in pose of autonomous vehicles based on blurring in single images;
   determining, by the one or more processors, a global position of the autonomous vehicle based on the generated change in pose of the autonomous vehicle; and
   transmitting, by the one or more processors, the global position to an autonomous vehicle controller configured to control the autonomous vehicle.

13. The method of claim 12, wherein the one or more processors are configured to execute the machine learning model using only the single image as input to generate the change in pose of the autonomous vehicle.

14. The method of claim 12, further comprising:
   encoding, by the one or more processors, one or more timestamps into one or more pixels of the single image,
      wherein executing the machine learning model comprises executing, by the one or more processors, the machine learning model using the single image encoded with the one or more timestamps.

15. The method of claim 14, wherein the machine learning model is trained to output changes in pose of autonomous vehicles based on blurred objects in individual images.

16. The method of claim 12, wherein the change in pose of the autonomous vehicle comprises one or more of a distance traveled of the autonomous vehicle during capture of the single image, a yaw of the autonomous vehicle during capture of the single image, a pitch of the autonomous vehicle during capture of the single image, or a roll of the autonomous vehicle during capture of the single image.

17. The method of claim 12, wherein determining the global position of the autonomous vehicle comprises:
   identifying, by the one or more processors, an initial position of the autonomous vehicle; and
   adjusting, by the one or more processors, the initial position of the autonomous vehicle based on the change in pose output by the machine learning model.

18. The method of claim 12, wherein the sensor is a first sensor, the single image is a first single image, and the machine learning model is a first machine learning model;
   wherein the autonomous vehicle comprises a plurality of sensors each configured to capture images of an environment surrounding the autonomous vehicle, the plurality of sensors comprising the first sensor; and
   wherein the method comprises:
      receiving, by the one or more processors, a plurality of images from the plurality of sensors, the plurality of images comprising the first single image and the plurality of sensors comprising the first sensor; and
      executing, by the one or more processors, a plurality of machine learning models using the plurality of images as input to generate a plurality of changes in pose of the autonomous vehicle, each of the plurality of machine learning models receiving a different single image of the plurality of images as input and generating a change in pose of the autonomous vehicle based on the input single image,
         wherein determining the global position of the autonomous vehicle comprises determining, by the one or more processors, the global position of the autonomous vehicle based on the plurality of changes in pose of the autonomous vehicle.

19. The method of claim 18, wherein each of the plurality of machine learning models is configured to have identical weights or parameters.

20. The method of claim 18, wherein the autonomous vehicle controller is configured to:
   select a trajectory for the autonomous vehicle based on the global position; and
   control the autonomous vehicle in a direction based on the trajectory.

* * * * *